United States Patent [19]

Sutton et al.

[11] Patent Number: 4,491,961
[45] Date of Patent: Jan. 1, 1985

[54] PIXEL CORRECTION LOGIC CIRCUIT

[75] Inventors: David Sutton, Margate, Fla.; Jimmie Neill, Walled Lake, Mich.

[73] Assignee: Burroughs Corporation, Detroit, Mich.

[21] Appl. No.: 348,519

[22] Filed: Feb. 12, 1982

[51] Int. Cl.³ .......................... G06K 9/36; H04N 1/40
[52] U.S. Cl. ..................................... 382/41; 358/284; 382/14; 382/50
[58] Field of Search ....................... 382/41, 14, 15, 50, 382/51-54; 358/282-284

[56] References Cited

U.S. PATENT DOCUMENTS

| 4,121,196 | 10/1978 | Johnson et al. | 382/41 |
| 4,129,853 | 12/1978 | Althouser et al. | 382/50 |
| 4,345,314 | 8/1982 | Melamud et al. | 382/51 |
| 4,408,343 | 10/1983 | Neill et al. | 382/54 |

Primary Examiner—John C. Martin
Assistant Examiner—Michael D. Parker
Attorney, Agent, or Firm—Thomas W. Baumgarten, Jr.; Kevin R. Peterson; David Rasmussen

[57] ABSTRACT

Unprocessed video signals from an optical scanner are processed in accordance with a transfer function which adjusts the gain of the unprocessed video to produce processed video which better represents the form of the object scanned. The transfer function is selected from a memory including a plurality of such functions by a signature signal which characterizes the entire scanner system including the optical system, the illumination system and the sensor system. The signature signal is developed from an initial value of signature which is updated by processing with the unprocessed video.

11 Claims, 7 Drawing Figures

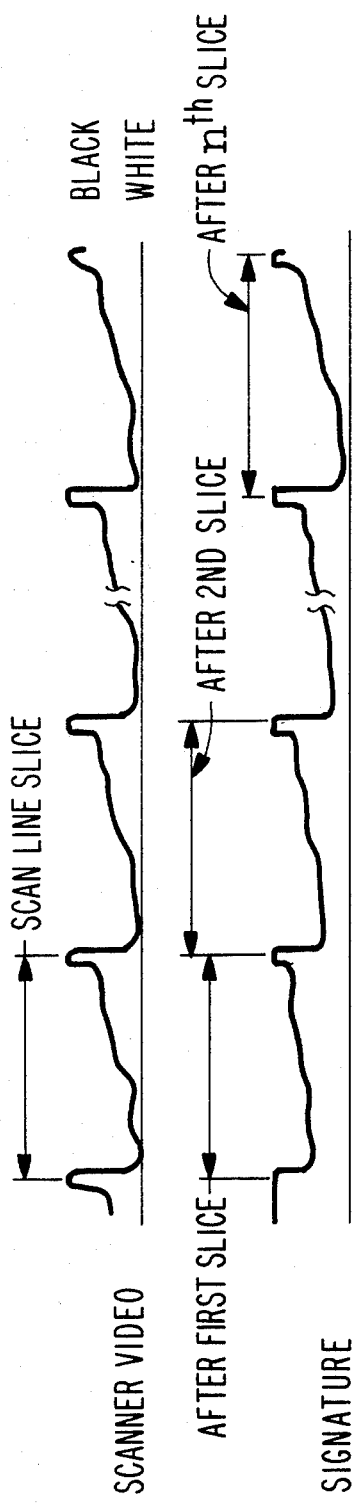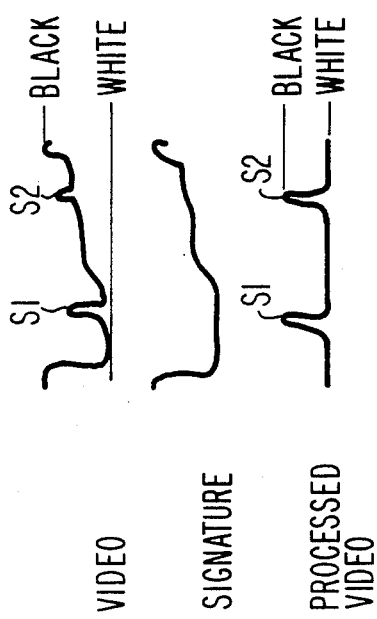
FIG.1A. GENERATION OF SIGNATURE
FIG.1B. GENERATION OF PROCESSED VIDEO

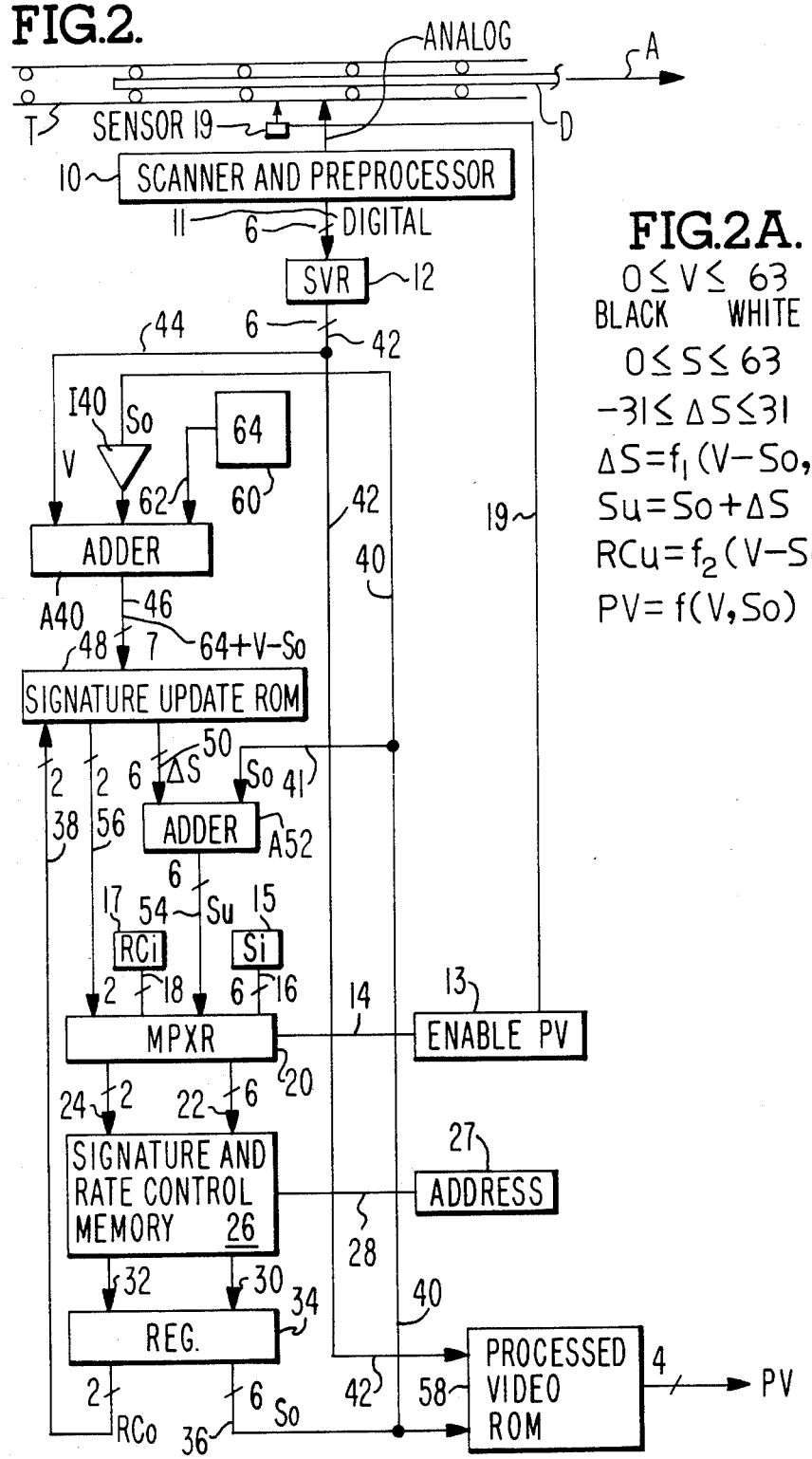

STATE DIAGRAM FOR UPDATING RC$\mu$

PIXEL CORRECTION LOGIC CIRCUIT

BACKGROUND OF THE INVENTION

1. Field of The Invention

The invention relates to optical scanning systems and to the correction of video signals derived from scanners in such systems. In particular, it relates to the correction of video signals to provide new, or processed, video signals which more accurately represent objects scanned by an optical scanner.

2. Description of The Prior Art

Raw or unprocessed video signals produced by a scanner in an optical reading system deviate from values which would accurately represent characters, or other information, being read. The deviations are due to a number of variables in the system, such as the following: (1) Illumination is not uniform across the field being scanned due to such things as differences in the light produced by a number of light sources, where the differences stem from differences in aging or differences which were built-in when they were manufactured. (2) Sensors in the scanner vary in sensitivity producing non-uniform output values from cell-to-cell. (3) Optical characteristics in the system vary due to such things as $cos^4$law effects and dust. (4) Reflections from the documents vary due to such things as differences in paper and differences in surface coatings.

Among the known prior art apparatus designed to overcome the variations in video signals are that disclosed in a U.S. patent application No. 35,993, now abandoned, filed in the name of Pepe Siy, Robert Bloss and Gary B. Copenhaver, on May 4, 1979 entitled "Adaptive OCR Front-End System" which was assigned to the same assignee as the present application. That prior art application discloses use of an equalization filter to compensate for differences in illumination detected over the face of a document and provides an equalized video output. The equalized video is stored and used for comparison with subsequent similarly attained equalized video to produce a corrected video. The present invention is patentably distinct in that it affords an improved system which provides corrections for variations in individual pixels caused by a wide range of parameters such as lack of uniformity in illumination, variations from cell-to-cell in a sensor array, optical effects such as $cos^4$law and dust, and differences in reflectances in different documents.

The present invention is useful as part of a system for reading and processing data in various formats such as that disclosed in a copending U.S. patent application Ser. No. 301,117, now abandoned, in the names of Pepe Siy and James Young entitled "Geometric Character Recognition Using Skelton and Stroke Width Representation" and assigned to the same assignee as the present invention. An example of a Thinner and Stroke Width Analyzer in combination with Feature Extraction is shown in U.S. Pat. No. 4,162,482 entitled "Preprocessing and Feature Extraction System for Character Recognition" which issued July 24, 1979 in the name of Chauchang Su and was assigned to the same assignee as the present application. The foregoing applications and patents are hereby incorporated by reference.

SUMMARY OF THE INVENTION

The pixel correction logic circuits of the present invention develop data representing a "signature" for each cell in the sensor. By extension, the term "signature" herein will be understood to include data representing a plurality of such pixels. The signature is used in making a selection of an output transfer function from among several such functions where the transfer functions enable compensation for variations in the video signals, i.e. adjust the gain.

The pixel correction logic circuits are cleared to a reference level between documents. On the passage of the leading edge of each document the signature is developed by adjusting a 6 bit binary number for each row of picture elements. These adjustments are based primarily on white sensing and asymptotically approach the characteristics of the scanner, optics and illumination system as multiplied by the reflectance of the document. Typically the signature is developed in the first few scans. On a piece of paper exhibiting uniform reflectance, the difference between the video from the scanner and the fully developed signature will be essentially zero. Stated in a different way, it may be said that the background represented by the paper surface is normalized; i.e. the reflective surface of the paper becomes the reference value, which is considered to be white regardless of the true color of the paper.

The system generates processed video accurately representing the form of objects scanned by a scanner and does so from unprocessed video signals representing an object scanned in a scanner system and incorporating errors due to imperfections in the system. Data representing a signature is generated in the system where the data characterizes the entire scanner system including the optical system, the illumination system and the sensor system. A plurality of transfer functions are stored in a memory for use in correcting the video to produce the processed video therefrom. The signature and the unprocessed video are applied to the means storing the transfer function where the signature selects the appropriate transfer function for use in correcting the unprocessed video and generating the desired processed video.

It being recognized that signals representing an image must be substantially free from anomalies introduced by the scanner and the illumination system before they can be effectively further processed and enhanced, it is an object of the invention to provide for removal of the anomalies.

BRIEF DESCRIPTION OF THE DRAWINGS

FIGS. 1A and 1B depict exemplary waveforms such as are involved in the practice of the invention.

FIG. 2 is a block diagram disclosing the organization of components to form a pixel correcting circuit in accordance with the invention.

FIG. 2A is a table establishing limits for certain mathematical relationships between variables involved in the block diagram of FIG. 2.

DESCRIPTION OF A PREFERRED EMBODIMENT

Figure 3:
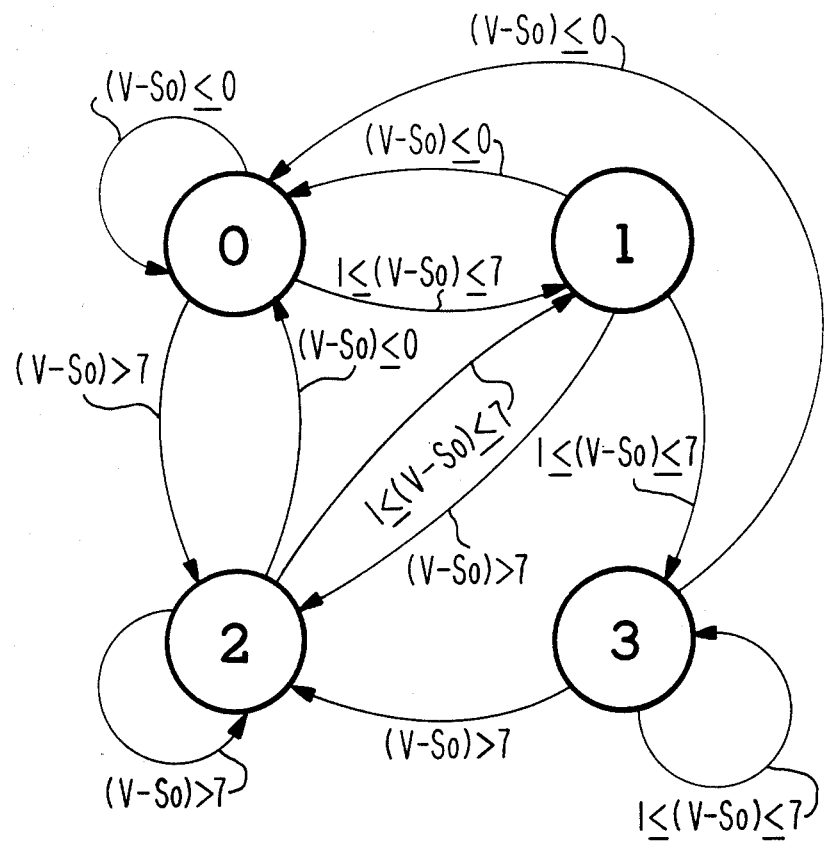
FIG. 3 is a state diagram for updating rate control.

Although embodiments of this invention are implemented digitally, their operation can be visualized in terms of analog signals. The upper portion of FIG. 1A shows analog waveforms representative of a video signal formed by a scanner from the face of a document exhibiting uniform reflectance. Lack of uniformity in the lighting and variations in sensitivity of elements across the scanner array, among other things, account for the variations in the waveforms.

The lower portion of FIG. 1A shows waveforms representing signature. The term "signature" (or S) used herein refers to a video signal used as a reference for removing unwanted, background variations in a plurality of pixels in a scan line. Signature is developed through an iterative process of successively scanning a subject document. The scanner video output is used to update the reference video signal with each successive scan so that the reference video signal eventually represents the portion of scanner video output comprising background characteristics of the video scanning system as multiplied by the reflectance of the document being scanned.

Referring to both portions of FIG. 1A, it will be seen that following each successive scan, designated "after 1st slice", "after 2nd slice" . . . "after nth slice", the signature waveforms come to resemble more closely the scanner video output. The amount by which signature is changed to approximate scanner video output during each successive scan is influenced by rate control (or RC). Rate control does this by keeping track of the relative size of the difference between signature and scanner video output in the preceeding scan and allowing signature to be updated in an amount commensurate with the size of the preceeding difference.

FIG. 1B shows an example of waveforms of use in the generation of processed video. In this example, two scanned horizontal strokes are indicated at S1 and S2 as part of an incremented or unprocessed video signal corresponding to that in the upper portion of FIG. 1A. The "signature" wave in the center of FIG. 1B is used to normalize the video signal by the processing apparatus according to the present invention to produce processed video, such as is shown on the bottom line of FIG. 1B. It will be seen that the resulting processed video presents the two strokes at the same amplitude, even though the corresponding analog signals have different amplitudes.

Turn now to the block diagram of FIG. 2 showing an organization of components into a Pixel Correction circuit in accordance with the invention.

The video input into the system is generated by a scanner and preprocessor at 10 which scans a document D as it passes by in the direction of the arrow A along a document transport track T. The output of the scanner at 10 is applied over a bus 11 as an input to the scanner video register at 12. In a preferred embodiment the scanner and preprocessor 10 includes a CCD type sensor having 1024 cells of which 648 are used to generate video, herein identified as unprocessed video, as the sensor scans along a signature scan line. It will be recognized that other sensors employing the same or different numbers of cells may be used without departing from the spirit of the invention. An example of the use of a scanner employing a diode array is shown in a copending U.S. Patent application Ser. No. 238,972, now U.S. Pat. No. 4,408,343, filed Feb. 27, 1981 in the names of Jimmie Neill, Nathaniel Webb, and Norman Hartig, entitled "Image Enhancement for Optical Character Readers". That application is assigned to the same assignee as the present invention and is hereby incorporated by reference.

The signal ENABLE PV (for ENABLE Processed Video) applied from a source 13 over line 14 to the multiplexer 20 is low during periods when no documents are going past a digital video scanner in a document processor. The ENABLE PV is provided, by means associated with the scanner, as the leading edge of a document passes, causing initial values of signature (or $S_i$) and Rate Control (or $RC_i$) to be applied from sources 15, 17 over busses 16, 18 via the multiplexer 20 and busses 22, 24 to be loaded into the Signature and Rate Control Memory 26. $S_i$ and $RC_i$ are constant values chosen within the dynamic range of signature and rate control. Sources 15 and 17 may be hard wired on a printed wiring board or soft loaded into a register, depending on particular system requirements, without departing from the spirit of the invention. For example, in one embodiment of the invention a value of 0 is chosen for $S_i$ and $RC_i$ by wiring input busses 16 and 18 of multiplexer 20 directly to system ground.

The memory 26 is an eight bit wide memory whose depth is equal to the height of the scan line minus one. The current values of signature and rate control, designated as $S_o$ and $RC_o$ respectively, are stored in memory 26. Six bits represent the signature, while the remaining two bits represent the rate control.

An address input applied from a source 27 over line 28 to the Signature and Rate Control Memory 26 controls a read out of signature and rate control over busses 30 and 32 to a Signature and Rate Control memory register 34. If the vertical scan is fixed, the register 34 can be implemented as a shift register and the Address can be generated by a free running counter whose base is equal to the scan height minus one. Register 34 is an 8 bit register used to buffer the output of the signature and rate control memories over busses 36 and 38.

The signal ENABLE PV over line 14 goes "high", in response to a signal over bus 19, when the leading edge of a document triggers a SENSOR 19 on entering the read station. The signal ENABLE PV enables the signature update logic employed with the Pixel Correction Circuitry of FIG. 2. Each $S_o$ read out of memory 26 over bus 30, buffer register 34, bus 36 and bus 40 via inverter I40 is subtracted in adder A40 from the corresponding pixel value coming in over busses 42 and 44. To avoid dealing with both positive and negative values, a positive value of 64 is added from a source 60 over line 62 to the difference $V-S_o$ to provide a value designated as $64+V$ $V-S_o$ at the ROM 48. The value $64+V-S_o$ over bus 46, together with $RC_o$ over bus 38, become the address inputs to Signature Update Table or Memory 48. Table, or memory, 48 may be formed by a $512\times8$ ROM which may be designated more fully as the Signature and Rate Control Up-Date ROM.

The memory 48 implements the algorithm, illustrated in Table A, for delta S and $RC_u$. If a soft load of the update algorithm is desired this would be implemented in a RAM. The value delta S ($\Delta S$) representing the amount by which the signature is being updated, is applied over bus 50 and the value $S_o$ is applied over bus 41 to be added in the adder A52 and produce the updated signature $S_u$. The updated values, $S_u$ and $RC_u$ are then applied over busses 54 and 56, respectively, via the multiplexer 20 for storage in the Signature and Rate Control Memory 26 until needed for the corresponding pixels in the next scan line.

Simultaneously with the foregoing, each value of $S_o$ read from the Memory 26 is applied over bus 36 to the Processed Video or PV ROM 58 for use in the selection of the appropriate transfer function (table B and FIGS. 4A, 4B) in the PV ROM 58. The PV ROM 58, in a preferred embodiment of the invention provides a 4K×4 look-up table in which an algorithm for gain adjustment, as expressed in terms of the output transfer functions, is stored. If a soft load of the transfer function is desired, the look-up table could be implemented with a RAM. This transfer function modifies the incoming 6-bit pixel value of unprocessed video V, received over bus 42 from a buffer 12, or 6-bit scanner video register 12, to produce the 4-bit processed video, PV. The unprocessed video V, it will be recognized, in turn orginated as scanner video SV from a scanner 10 before storage in the scanner video register 12.

SAMPLE ALGORITHMS

An exemplary algorithm for use in the signature update PROM 48 to provide RCu and delta S ($\Delta S$) is indicated in Table A, as follows:

|  | RCo | RCu | $\Delta S$ |
|---|---|---|---|
| $(V-S_o)<0$ | 0 | 0 | 0 |
|  | 1 | 0 | 0 |
|  | 2 | 0 | 0 |
|  | 3 | 0 | 0 |
| $.1<(V-S_o)<7$ | 0 | 1 | 0 |
|  | 1 | 3 | $(V-S_o)/3$ |
|  | 2 | 1 | 0 |
|  | 3 | 3 | $(V-S_o)/2$ |
| $(V-S_o)>7$ | 0 | 2 | $(V-S_o)/4$ |
|  | 1 | 2 | $(V-S_o)/4$ |
|  | 2 | 2 | $(V-S_o)/2$ |
|  | 3 | 2 | $(V-S_o)/4$ |

In this example, the maximum correction rate, $(V-S_o)/2$, is not reached until at least the second occurance of $(V-S_o)$ within the same range. This will lessen the effects which noise and document "hot spots" have on the updated signature, $S_u$.

Reference may be made to FIG. 3 for a related state diagram for updating RCu.

Figure 4A:
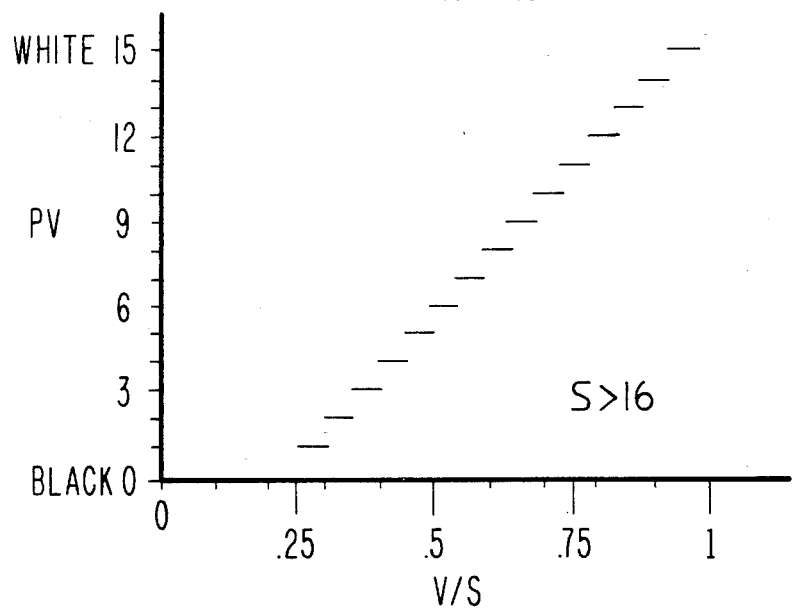
FIGS. 4A and 4B show examples of output transfer functions.
Figure 4B:
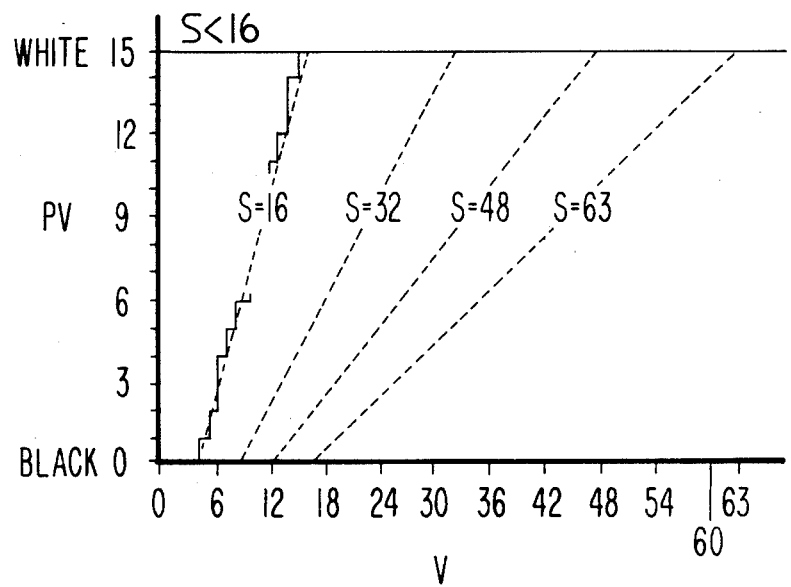

An examplary algorithm for an output transfer function is indicated in Table B, below. In this example an output transfer function will output white (PV=15) for S<16 or V≧S; will output black (PV=0) for V/S≦0.25 and will linearly assign the 14 gray levels between black and white for 0.25S<V<0.95S. Reference may be made to FIGS. 4A and 4B for sample output functions.

For S<16:PV=15
For V≧0.95S:PV=15
For V≦0.25S:PV=0
For 0.25S<V<0.95S:PV=20 (V/S)−4
Rounded to the nearest whole number.

TABLE B

The algorithms in Tables A and B are given as examples only. Apparatus arranged according to the present invention can accommodate many other algorithms subject to limitations set forth in Table C, as follows:

$PV = f(V, S_o)$
$S = f_1(V - S_o, RC_o)$
$S_u = S_o + \Delta S$
$RC_u = f_2(V - S_o, RC_o)$

TABLE C

What is claimed is:

1. A system for generating processed video signals representative of the form of objects scanned by a scanner, comprising:

means for receiving unprocessed video signals from a scanner system;
means coupled responsive to said unprocessed video signals for generating data representing a signature characterizing the entire scanner system including the optical system, the illumination system and the sensor system;
means for storing a plurality of transfer functions of use in correcting the unprocessed video to produce processed video therefrom; and
means for applying said signature and said unprocessed video signals to said means for storing to enable selection of a transfer function to correct the unprocessed video and generate the desired processed video.

2. A system as claimed in claim 1, in which the means for generating data representing a signature comprises:
means for receiving data representing an initial signature which is a first approximation of a correction for errors in the unprocessed video signal;
means coupled for subtracting said initial signature from said unprocessed video signals to provide a signal representing the difference between the two;
means employing an algorithm coupled to receive said signal representing the difference and provide a difference signal; and
means summing the difference signal with the value of the signature to provide an updated signature.

3. A system as claimed in claim 1, in which the means for generating data representing a signature comprises:
multiplexer means responsive to enable signals for introducing an initial value for signature to a signature memory;
means coupling said initial value for signature and said unprocessed video signals to subtracting means to provide a signal reflecting the difference between the two;
a signature update memory, incorporating an algorithm, responsive to said signal reflecting the difference to provide an updated value for the signal reflecting the difference; and
means coupling said updated value of the signal reflecting the difference to an adder to be summed with said signature to provide an updated value of signature.

4. The invention as claimed in claim 1, in which:
the selected transfer function provides information for adjusting the gain of the unprocessed video in order to produce the processed video.

5. A system for correcting unprocessed video signals from an optical scanner, said system providing processed video signals accurately representing the object scanned, said system comprising:
means for receiving unprocessed video signals;
means for receiving data representing an initial signature which is a first approximation of a correction for errors in the unprocessed video signal;
means coupled for subtracting said initial signature from said unprocessed video signals to provide a signal representing the difference between the two;
means employing an algorithm coupled to receive said signal representing the difference and provide a difference signal;
means summing the difference signal with the value of the signature to provide an updated signature; and
means for storing a plurality of transfer functions, receiving said updated signature and said unprocesseed video signals, selecting a transfer function for use in correcting errors in said unprocessed video signals, and adjusting the gain of said unprocessed video signals in accordance with said transfer function selected, to provide processed video signals representing the object scanned.

6. A system for correcting unprocessed video signals produced as a scanner scans an object, said system providing processed video signals accurately representing the object scanned by sensor cells in the scanner, said system comprising:

means for receiving unprocessed video signals representing a scanned object;

multiplexer means responsive to enable signals for introducing an initial value for signature to a signature memory;

means coupling said initial value for signature and said unprocessed video signals to subtracting means to provide a signal reflecting the difference between the two;

a signature update memory, incorporating an algorithm, responsive to said signal reflecting the difference to provide an updated value for the signal reflecting the difference;

means coupling said updated value of the signal reflecting the difference to an adder to be summed with said signature to provide an updated value of signature;

said signature memory coupled to receive said updated value of signature;

a processed video memory incorporating an algorithm for adjusting gain of unprocessed video signals; and means coupling said processed video memory to receive signature from said signature memory and unprocessed video signals from the scanner and adjust the gain of the unprocessed video signals to produce processed video signals representing an object scanned.

7. The invention as claimed in claim 6, in which:

the signature update memory functions as a signature and rate control update memory;

the signature memory functions as a signature and rate control memory;

the multiplexer means is responsive to said enable signals to introduce an initial value for rate control signals to the signature and rate control memory, where the rate control signals include data containing information about the rate of the signature update on the preceeding scan line; and means are provided for coupling said rate control to the signature and rate control update memory to provide an updated value for rate control.

8. The invention as claimed in claims 1, 2, 3, 4 or 5 in which the unprocessed video signals represent a plurality of pixels corresponding to individual points on the object scanned, and the processed video represents said pixels with their individual values adjusted to correspond to values of the individual points in the object scanned.

9. A system for scanning objects and providing accurate representations of the objects scanned, comprising:

a conveyor system along which documents travel;

means including a scanner aligned to read data on said documents passing along the conveyor system and provide unprocessed video signals representative of said data;

multiplexer means responsive to enable signals for introducing an initial value for signature to a signature memory;

means coupling said initial value for signature and said unprocessed video signals to subtracting means to provide a signal reflecting the difference between the two;

a signature update memory, incorporating an algorithm, responsive to said signal reflecting the difference to provide an updated value for the signal reflecting the difference;

means coupling said updated value of the signal reflecting the difference to an adder to be summed with said signature to provide an updated value of signature;

a signature memory coupled to receive said updated value of signature;

a processed video memory incorporating an algorithm for adjusting gain of unprocessed video signals; and means coupling said processed video memory to receive signature from said signature memory and unprocessed video signals from the scanner and adjust the gain of the unprocessed video signals to produce processed video signals representing an object scanned.

10. A method for correcting unprocessed video signals derived from an optical scanner comprising:

providing a source of unprocessed video signals;

providing an initial signature representing a first approximation of data of use in correcting for error in a pixel value;

subtracting said initial signature from said unprocessed video signals to provide a signal representing the difference between the two;

updating said signal representing the difference by use of an algorithm to provide an updated value for the signal representing the difference;

summing the updated value for the signal representing the difference with the value of the signature to provide an updated signature; and employing said updated signature to select a transfer function of use in correcting errors in said unprocessed video signals.

11. The method as claimed in claim 10, including the additional steps of:

providing a signal representing the initial value for rate control, where rate control includes data containing information about the rate of the signature update on the preceeding scan line; and updating said signal representing the initial value for rate control by use of an algorithm to provide an updated value for the signal representing rate control.

* * * * *